United States Patent Office 3,288,011
Patented Nov. 29, 1966

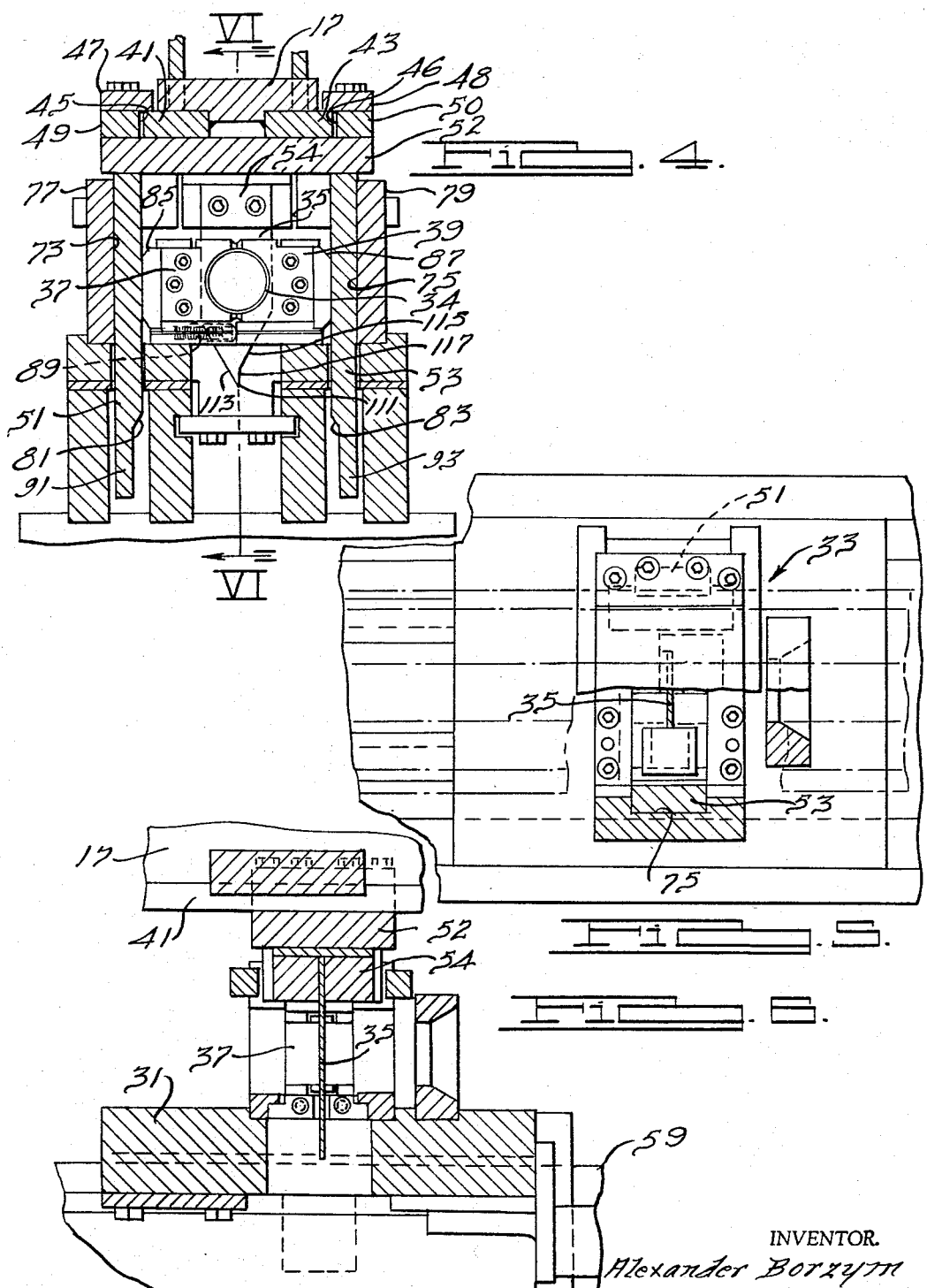

3,288,011
FLYING CUTOFF MACHINE WITH SWINGING RAM
Alexander Borzym, 6841 Oakman Blvd., Dearborn, Mich.
Filed June 30, 1965, Ser. No. 468,240
1 Claim. (Cl. 83—310)

The present invention relates to an improved apparatus for cutting elongated stock such as metal of tubular or other cross-sectional configuration and is particularly adapted to rapid, high production cutoff of material emanating from a tube mill.

An important object of the invention is to provide a flying cutoff apparatus which is capable of rapidly severing tubing and other elongated materials of variant thicknesses, wherein the apparatus employs an improved cutoff ram and carriage assembly capable of high speed operation and having a highly simplified and relatively inexpensive construction.

Another object is the provision of a flying cutoff apparatus of the above character, employing a greatly simplified ram mounting and drive assembly.

Another object is the provision of a flying cutoff apparatus employing an improved cutoff blade capable of severing metal tubing without materially distorting the cross sectional shape thereof.

Further objects include an improved flying cutoff apparatus which is relatively inexpensive to manufacture, rugged in construction and reliable in use.

Other objects and advantages will become apparent upon consideration of the following description and claim taken in conjunction with the drawings in which:

FIG. 4 is an enlarged fragmentary elevational sectional view taken substantially along the line IV—IV of FIG. 2 and looking in the direction of the arrows;

FIG. 5 is an enlarged fragmentary sectional plan view taken substantially along the line V—V of FIG. 2 and looking in the direction of the arrows; and FIG. 6 is a sectional elevational view taken substantially along the line VI—VI of FIG. 4 and looking in the direction of the arrows.

Figure 1:
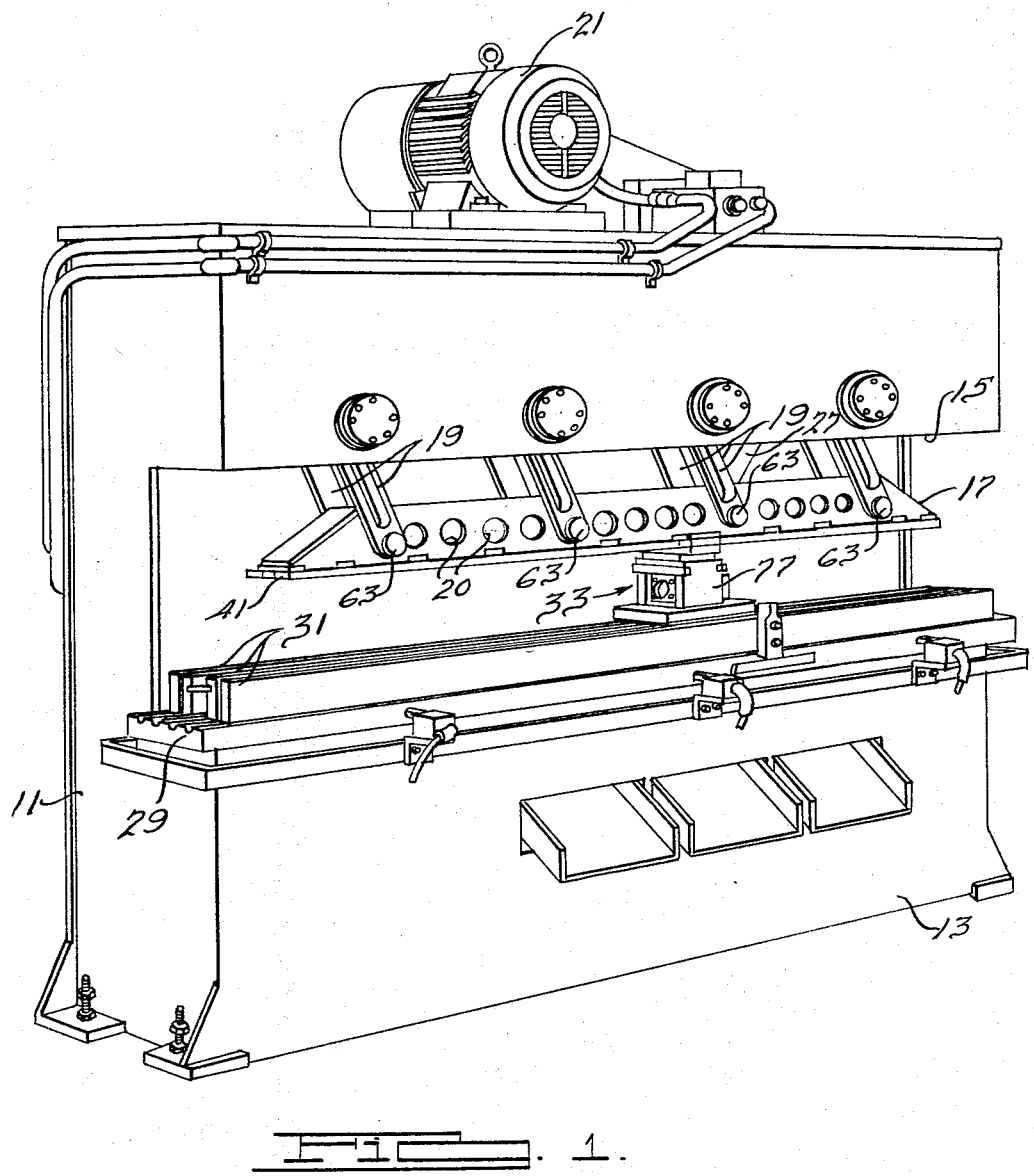
FIGURE 1 is a perspective view of a cutoff machine incorporating my invention.

Referring now to the drawings, the machine of my present invention has a cutoff blade supported by a carriage movable with the axial travel of the tubing being severed. A vertically swinging and rapidly moving ram is interconnected with the blade so as to permit blade and carriage movement with axial tubing travel and undergoes movement through a limited path to cause the blade to reciprocate relative to the carriage and transversely of the direction of tube movement and sever the tube. The blade is pointed and shaped in a manner so as to pierce and sever relatively thin tubing without materially distorting its cross section and without interrupting its axial travel.

While the machine construction and the actuating mechanism may be varied in detailed structural features, a preferred form illustrated comprises essentially a frame 11 having a bed portion 13 and a head portion 15 spaced above the bed. A ram 17 is carried by the head portion 15 through a plurality of spaced pairs of links 19 pivoted at one end to the head and at their other end to the ram so that the ram can swing through a vertical arc relative to the bed portion 13. The ram 17 may have a plurality of holes 20 formed therein to reduce its weight and therefore its inertia without severe loss of strength. Drive means, comprising an electric motor 21, is connected to a crankshaft 23 by pulleys and a belt (not shown), the crankshaft 23, in turn, having a crank 25 rotatably connected to one end of a connecting rod 27. The other end of the connecting rod 27 is pivotally connected to the ram 17 so that rotation of the crankshaft 23 causes the ram 17 to swing through an arcuate path, the limits of which are shown in full lines and dot-dash lines in FIG. 2. These particular connections are treated in more detail below.

The bed portion 13 has a plate 29 secured thereto which supports a plurality of stationary rails 31. A carriage 33 is slidably supported on the rails 31 beneath the ram 17. The work, in this case relatively thin-walled metal tubing 34, is presumed to travel in an axial direction generally parallel to the rails 31 and may be emanating, for example, from tube forming means of the extrusion or seam welding type. For clarity, the tubing is omitted from most of the views and is shown only in FIG. 4.

As described above, the carriage 33 supports a cutoff blade 35 for reciprocation relative to the carriage and transversely of the direction of work travel (FIGS. 4–6). In addition, a pair of releasable chuck jaws 37 and 39, supported by the carriage 33, is adapted to grip the tubing and rigidly position it and the carriage with relation to each other during the cutting operation. The jaws 37 and 39 are both slotted to slidably and unimpedingly guide the blade 35 in its reciprocatory path.

The ram 17 is provided with a pair of spaced-apart elongated guide plates 41, 43 rigidly attached thereto and extending longitudinally thereof and parallel to the axis of the work. These guide plates 41, 43 are slidably received in opposed ways 45, 46 formed by horizontal guide plates 47, 48, spacer plates 49, 50, respectively, and a blade mounting plate 52. A pair of chuck actuating cam 51 and 53 depend from the mounting plate 52 and the blade 35 is secured to the mounting plate through a holder 54. Vertical movement of the ram 17, therefore, effects vertical movement of the blade 35 even as the blade and carriage 33 travel along the rails 31. In addition, vertical ram movement actuates the chuck jaws 37 and 39 through the cams 51 and 53 in a manner to be described.

Figure 2:
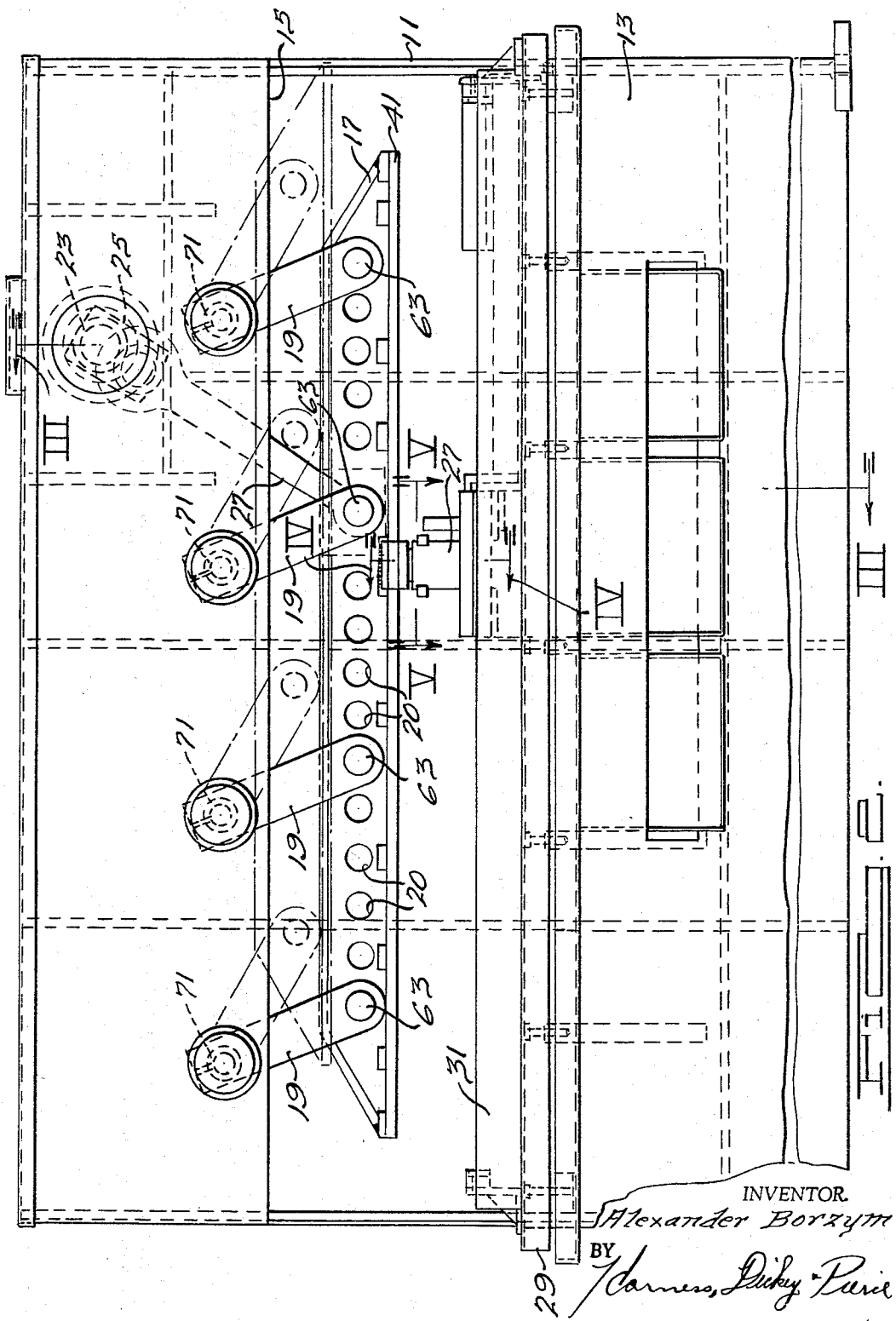
FIG. 2 is a front elevational view of the machine on a larger scale.

FIGS. 1, 3–6, and FIG. 2 in full lines show the parts in positions they occupy at the bottom of the stroke of the ram corresponding to the completion of a tube cutoff operation but before the parts have returned to their initial position for the next tube cutoff operation. FIG. 2, in dot-dash lines illustrates the ram in its initial position. In this position, the ram 17 is at the top of its stroke, the chuck jaws 37 and 39 are released, the carriage 33 is toward the right as seen in FIGS. 1 and 2 and the tubing would be moving freely through the released jaws 37 and 39. When the tubing reaches a position representing a length at which a cut is required, it initiates operation of the machine by suitable trip means. Alternatively, the machine can be turned "on" and operate independently to sever the work into predetermined length pieces. The trip means in the first instance and the control means in the second instance are well known in the art and form no part of this invention and are, therefore, not illustrated.

In either case, a pneumatic clutch 55 or other suitable driving means is engaged when the machine is energized and is effective to engage a pulley (not shown) driven by the motor 21, with the crankshaft 23. This pulley is disposed on the crankshaft 23 adjacent the clutch 55 and is covered by a shield 56. The same trip or control means is effective to initiate actuation of the carriage 33 to move it with the work. The carriage means may be powered by air and/or hydraulic piston and cylinder elements, the piston being connected to the carriage 33 through a push rod 59 shown partially in FIG. 6. Actuating means of this type are well known in the art and are not illustrated here since they form no part of this invention. However, this actuating means accelerates the carriage 33 to the speed of the work in the interval before the chuck jaws 37 and 39 close, and the carriage travels along the rails 31 with the work during the cutoff operation and is returned by the actuating means in preparation for the next cutoff cycle.

Figure 3:
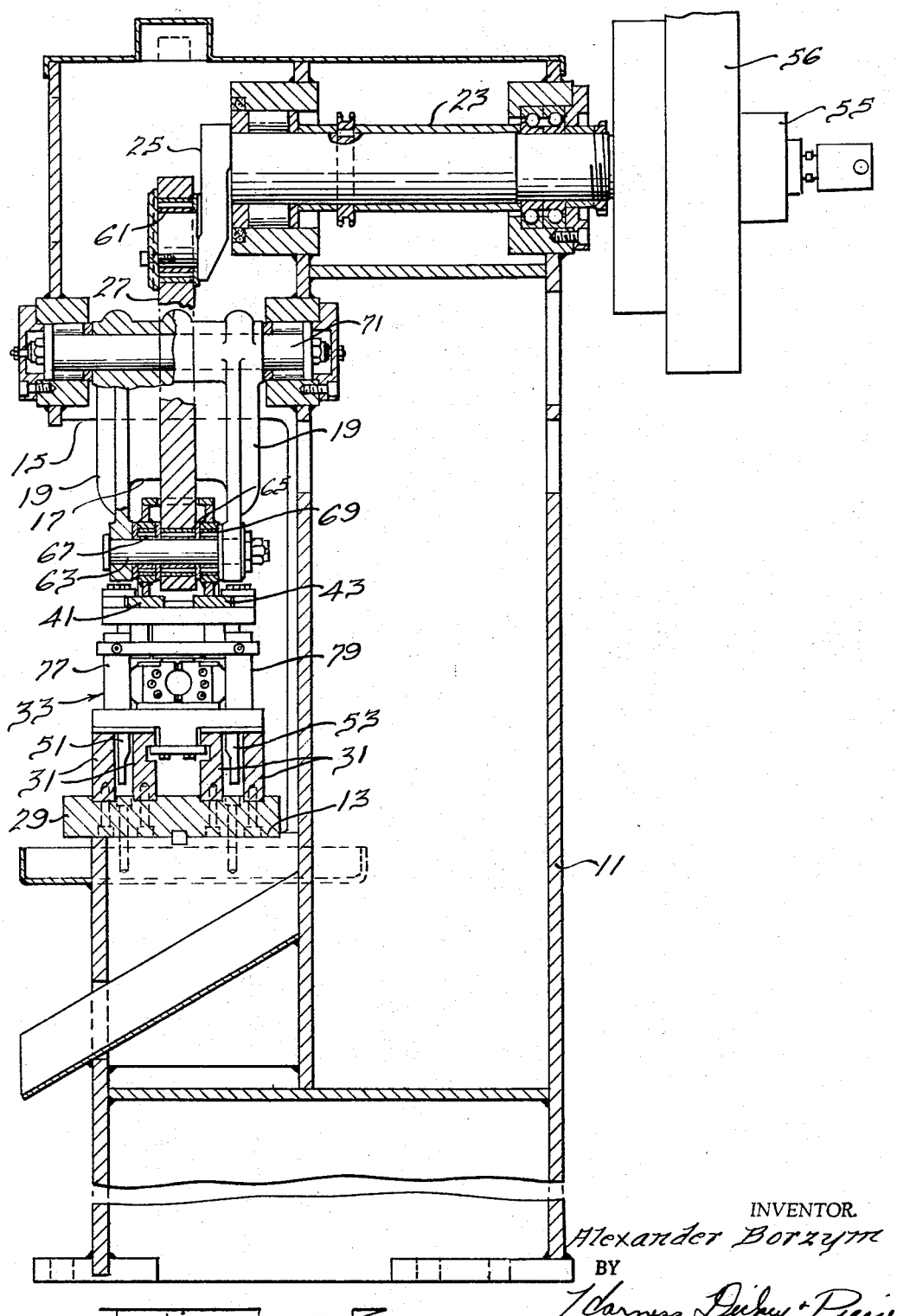
FIG. 3 is a sectional elevational view taken substantially along the line III—III of FIG. 2 and looking in the direction of the arrows.

As shown perhaps best in FIGS. 2 and 3, the crankshaft 23 has its crank 25 rotatably secured to one end of the connecting rod 27 through a bearing assembly 61. The other end of the connecting rod 27 is pivotally mounted on a pin 63 through a bearing 65. The pin 63 extends through the ram 17 and a pair of bearings 67 and 69 mounted therein. The pin 63 also pivotally interconnects the ends of one pair of links 19 to the ram 17 with the other ends of this pair of links 19 being pivotally carried by the frame head portion through a pivot pin 71. Each of the other pairs of links 19 is similarly pivoted through pins 63 and 71 to the ram 17 and frame head 15, respectively, so that the ram 17 swings through an arc with limits illustrated by the full line and dot-dash positions in FIG. 2 as the crankshaft 23 rotates.

As the ram 17 swings downwardly, it moves the blade mounting plate 52 downwardly. This, in turn, also moves the blade 35 and the chuck jaw actuating cams 51 and 53 downwardly, these cams being guided in vertical ways 73 and 75 formed in a pair of carriage side plates 77 and 79, respectively. Each of the cams 51, 53 has a cam surface 81, 83 facing downwardly and inwardly and adapted to engage a respective upwardly and outwardly facing cam surface 85, 87 on the chuck jaws 37, 39. Thus, when the cam surfaces 81, 83 move downwardly past the surfaces 85, 87, the jaws 37, 39 are moved inwardly toward each other to grip the tubing. At the same time, the blade 35 moves downwardly and cuts through the tubing after it is gripped and held by the jaws 37, 39. When the ram 17 swings upwardly, the blade 35 is withdrawn, the cam surfaces 81, 83 move upwardly past surfaces 85, 87 and the jaws 37, 39 move outwardly to release the work under the force of a compression spring 89 (FIG. 4). A lower extension 91, 93 of each of the cams 51, 53 remains in contact with the jaws 37, 39 when the ram 17 moves upwardly to position the jaws in preparation for the next cutoff cycle.

As will be appreciated, the blade 35 and its mounting require accurate vertical guides and this is provided by the ways 73, 75 which guide the jaw actuating cams 51, 53 rigid with the blade mounting plate 52 and by the slotted jaws 37, 39 which guide the blade 35. The relatively heavy ram 17 swings through an arcuate path determined by the links 19 and by the throw of the crank 25 and requires no accurate vertical guides since it functions simply to transfer vertical movement to the blade 35 through the guide plates 41, 43 and the blade mounting plate 52 which slides relative thereto. Thus no such expensive and accurate vertical guides for the relatively large and heavy ram are required such as have commonly been used heretofore.

In the illustrated embodiment, four sets of links 19 are shown interconnecting the ram 17 and the frame head portion 15. With this construction and by reason of the fact that the ram 17 travels through only a relatively small arcuate path thereby limiting the ram inertia forces, a very high ram speed is made possible which is capable of cutting tubing of up to about 1¾ inches O.D. moving at speeds of up to 1200 feet per minute. However, it is to be understood that this illustrated number of links 19 and arcuate path of ram travel are matters of design and that conditions in a particular installation may make variations desirable. For example, if the tube travel is relatively slower and a pair of shorter proportions is adopted by the designer it may be supported adequately by means of two or three sets of links instead of four. Similarly, larger diameter tubing may require a greater arcuate path of ram travel. This, in turn, increases the ram inertia forces and decreases the upper limit of ram speed and tube travel.

As another feature of my invention, there is provided an improved cutoff blade, adapted to rapidly sever relatively thin-walled tubing in a single stroke without any material distortion of the tube cross section. In the past, the tube cutoff blades of many flying tube cutoff apparatus tended to deform the tube wall inwardly at the initial point of severance and resulted in undesirable distortion in the cross section of the severed tube.

As best seen in FIG. 4, the blade 35 comprises an elongated generally flat body having a pointed end 111 aligned substantially with a longitudinal central axis of the blade body and intersecting the tube longitudinal axis. The blade 35 has a first tapered edge 113 extending from the pointed end 111 to one side edge and a second tapered edge 115 extending from a region spaced rearwardly of the pointed end 111 to the other side edge thereof. A straight edge 117 extends along the blade central axis and connects the pointed end 111 and the second tapered edge 115.

As the blade 35 moves through the cutoff cycle, the pointed end 111 first contacts and pierces the top center portion of the tubing, the end 111 being sharp enough to pierce the tube wall without distorting its cross section. Continued movement of the blade 35 through the tube causes the edge 113 to sever the top portion of the tube wall progressively away from and to one side of the pierced top center, exerting primarily a lateral force and only a relatively small radial inward force on the tube wall which is insufficient to distort the tube. During this time, the blade straight edge 117 abuts the severed edge of the tube wall adjacent the pierced top center and supports the tube against turning within the jaws 37, 39 under the lateral severing force of the blade edge 113. The edge 117 has a length such that when the blade 35 has moved sufficiently through the cutting stroke to bring the edge 115 into contact with and to sever the top portion of the tube wall on the other side of the pierced top center, the edge 113 is severing the side portion of the tube wall where the force exerted on the tube wall thereby is substantially tangent to the tube wall and there no longer is any substantial radial inward force exerted on the tube wall by this portion of the blade sufficient to distort the tube wall inwardly. As was the case with the edge 113, the edge 115 initially exerts primarily a lateral force on the tube as it severs the wall top portion and a relatively insignificant radial inward force, after which the edge 115 severs the other side portion of the tube wall exerting forces substantially tangent to the tube wall. The point 111 and the edges 113 and 115 together sever the bottom of the tube wall as the blade completes the cutting stroke and the chuck jaws 37 and 39, which surround and engage the outer wall surface, support this wall sufficiently to prevent any distortion under the blade cutting force.

By my present invention, there is provided a flying tube cutoff apparatus having a greatly simplified cutter moving assembly and a greatly improved tube cutting blade construction, and while preferred embodiments of my invention are illustrated and described in detail hereinabove, it will be apparent that certain additions, substitutions, modifications and omissions may be made thereto without departing from the spirit of the invention as encompassed in the subjoined claim.

What is claimed is:

In a cutoff machine or the like for treating elongated work while the work is traveling in a path longitudinal of itself, a press frame having a flat bed extending parallel to and beneath said work path, said frame also having a head spacedly overhanging the bed and path, a ram extending parallel to said path above the bed, a plurality of parallelogram links supporting the ram from the head for translatory swinging movement toward and from said path about axes perpendicular to the path, means including a crank and a connecting rod for imparting harmonic oscillatory swinging movement to said ram about said axes, tracks on the ram and on the bed parallel to said path, and a die carriage slidable along said tracks and having work engaging parts actuatable by such swinging movement of the ram.

References Cited by the Examiner

UNITED STATES PATENTS

| | | |
|---|---|---|
| 2,198,599 | 4/1940 | Borzym. |
| 2,630,177 | 3/1953 | Dellinger _____ 83—308 |
| 2,741,309 | 4/1956 | Czarnik _____ 83—320 X |
| 3,040,611 | 6/1962 | Tournaire _____ 83—636 |

FOREIGN PATENTS 828,789   1/1952   Germany.

WILLIAM W. DYER, Jr., *Primary Examiner.*

J. M. MEISTER, *Assistant Examiner.*